US007113601B2

(12) United States Patent
Ananda

(10) Patent No.: US 7,113,601 B2
(45) Date of Patent: Sep. 26, 2006

(54) METHOD AND APPARATUS FOR PERFORMING SECURE COMMUNICATIONS

(76) Inventor: Mohan Ananda, 549 Lakeview Canyon Rd., Westlake Village, CA (US) 91362

( * ) Notice: Subject to any disclaimer, the term of this patent is extended or adjusted under 35 U.S.C. 154(b) by 738 days.

(21) Appl. No.: 09/965,682

(22) Filed: Sep. 26, 2001

(65) Prior Publication Data

US 2003/0061496 A1  Mar. 27, 2003

(51) Int. Cl.
*H04L 9/00* (2006.01)
*H04K 1/00* (2006.01)
*H04M 1/66* (2006.01)

(52) U.S. Cl. ............... 380/282; 380/255; 380/277; 455/410

(58) Field of Classification Search ......... 380/282, 380/283, 277, 285, 44, 270, 255, 247; 455/410
See application file for complete search history.

(56) References Cited

U.S. PATENT DOCUMENTS 6,598,164 B1 * 7/2003 Shepard ............. 713/189
2001/0050990 A1 * 12/2001 Sudia ............. 380/286

OTHER PUBLICATIONS

PGPfone—Pretty Good Privacy Phone [online], [retrived on Feb. 11, 2002]. Retrieved from the Internet: <URL: http://www.pgpi.org/products/pgpfone/>.
Application-Specific Integrated Circuit—A Whatis Definition—See also: ASCI [online], [retrieved on Feb. 11, 2002]. Retrived from the Internet: <URL: http://whatis.techtarget.com/definition/0..sid_9_gci213785,00.html>.
Philip R. Zimmermann, PGPfone Pretty Good Privacy Phone, Jul. 8, 1996, 81 pages, Owner's Manual, Version 1.0 beta 7.
Bruce Schneier, Applied Cryptography: Protocols, Algorithms, and Source Code in C, Second Edition, 1996, 758 pages, John Wiley & Sons, Inc.
RSA Laboratories, Cryptography FAQ, What is the RSA cryptosystem?, 1 page http://www.rsasecurity.com/rsalabs/faq/3-1-1.html, Apr. 12, 2001.
Oli Cooper: An introduction to modern cryptography, 17 pages, http://www.cs.bris.ac.uk/~cooper/Cryptography/crypto.html, last updated Feb. 22, 2001.

* cited by examiner

*Primary Examiner*—Matthew Smithers
*Assistant Examiner*—Courtney Fields
(74) *Attorney, Agent, or Firm*—The Hecker Law Group, PLC

(57) ABSTRACT

A method for enabling secure communication over a network is described. This method employs a public/private key encryption/decryption algorithm through a secure communication device. The communication device is designated as capable of secure communication when it is equipped with the necessary electronics to perform the encryption and decryption, as one embodiment is described herein. The encryption/decryption method utilized by embodiments of the invention can be incorporated into the modification of, conventional communication terminals such as a telephone. Such modifications are comprised of, but not limited to, the addition of components (refer to FIG. 1) capable of converting voice signals to digital signals and vice versa. The communication terminal may also include, for example, a specially designed ASIC processor and/or software configured to encrypt and decrypt data. In one embodiment of the invention measures are taken to limit accessibility to the keys utilized to perform encryption/decryption.

30 Claims, 5 Drawing Sheets

METHOD AND APPARATUS FOR PERFORMING SECURE COMMUNICATIONS

FIELD OF THE INVENTION

An embodiment of the invention relates to a method and apparatus for performing secure communication. In particular, the invention permits secure communication over wired or wireless networks using a public/private key encryption/decryption algorithm.

BACKGROUND

Communication security is a concern to many businesses, governments, and other institutions or individuals. Most telephone communications are in "clear mode" which means that none of the data sent between the participants is encrypted. An eavesdropper can therefore easily obtain and review such telephone communications. As a result, businesses, government institutions, and individuals concerned with security, view clear mode communications as problematic.

Cordless and cellular transmissions are especially vulnerable to eavesdropping. Cordless phones, for example, operate like much like radio stations. Signals from cordless or cellular transmissions can be picked up by a number of devices including radio scanners, baby monitors, radios and other such devices. The signal carrying a wireless conversation can usually be transmitted and overheard up to one-fourth of a mile away, and it is sometimes possible for conversations to travel up to two miles away. Cellular phones send radio signals to low-power transmitters typically located within five to twelve miles in radius of a particular cellular phone. Eavesdroppers can usually not pick up cellular phone calls by electronic devices such as radios and baby monitors, but they can receive them with radio scanners.

There is a growing need to protect the information communicated over all sorts of telephone networks. In particular the need for security has become more important due to the growth of the number of wireless/cellular telephones. In 1996 over sixteen percent of people in the U.S. owned a cellular phone. By 1998 over twenty five percent of people in the U.S used cellular phones, compared to 1999 when wireless telephone subscribers in the U.S jumped twenty four point three percent to a total of 86 million wireless customers.

| Year | Approximate % of U.S Population with Cellular/PCS Phones | Growth Rate % | Average Minutes/Month of Cellular Usage |
|---|---|---|---|
| 1996 | 16.6 | | |
| 1998 | 25.6 | +54.0 | 89 |
| 1999 | 30.0 | +24.3 | 155 |
| 2000 (based on a population size of 283,989,290) | 38.0* | +26.7 | 247 |

*Includes pagers

Because eavesdropping is an ever-increasing threat to privacy, there is an ongoing interest in developing systems, cryptosystems or systems that put messages into coded form, that would eliminate or substantially reduce this threat.

There are systems that provide a mechanism for secure a communication channel. However, these systems lack a mechanism for effectively protecting the keys used to encrypt and/or decrypt data sent across the network. For example, none of the current systems for performing secure communication use an architecture that adequately protects the encryption keys while still retaining the keys within the device.

Therefore there is a need for a system that provides users with the option to secure voice data as it is transmitted between different types of telephones while simultaneously protecting the key pairs used to encrypt and/or decrypt messages without requiring the user to understand or participate in how such key pairs are utilized.

SUMMARY OF THE INVENTION

An embodiment of the invention comprises a system for performing secure telephone communications over a network. The network may be an interrelated system of secure communication terminals connected in a wired or wireless fashion using packet switched, circuit switched, or any other viable interconnection mechanism.

The components of the system utilized in accordance with one embodiment of the invention may comprise any communication device having an embedded chip that contains a secure portion for holding encryption and/or decryption keys. The key information may, for example, be embedded into an Application Specific Integrated Circuit (ASIC) or some other type of embedded component. Each device embodying the invention also contains a user interface equipped with mechanisms for controlling the communication device and hardware or software configured to handle the secure encryption and decryption of data. The embedded chip may be placed within the hardware of the communication device (e.g., a secure telephone) and security is achieved in one embodiment of the invention by employing an encryption/decryption scheme that utilizes a public/private key architecture within the chip. Such an encryption scheme may be referred to as an asymmetric cryptosystem. In asymmetric encryption schemes the key that encrypts a communication cannot decrypt that communication. The receiver of the encrypted communication utilizes the private key of the receiver of the communication to decipher encryption encoded by the sender user's public key.

This encryption/decryption method is utilized by embodiments of the invention and incorporated into the modification of, conventional communication terminals such as a telephone. Such modifications are comprised of, but not limited to, the addition of components (refer to FIG. 1) capable of converting voice signals to digital signals and vice versa. The communication terminal may also include, for example, a specially designed ASIC processor and/or software configured to encrypt and decrypt data.

In one embodiment of the invention, the ASIC comprises an embedded private key. The key resides in a secure portion of the ASIC. The invention also contemplates storage of private keys in secured portions of various appropriate types of memory such as RAM, ROM, Flash Memory, optical gel pack, etc. The public key which complements the private key may be stored in memory in a way that makes the key widely accessible to all. The components of the secure communication device may be embedded into hardware components, part of a secure communication center, or implemented by a computer program in a software subroutine.

The communication devices configured in accordance with an embodiment of the invention are backwards compatible with current communication devices because each secure device can also be used in a standard, unprotected mode. Each communication device's user interface may allow the user to both select and be notified of the status of the communication (refer to FIG. 2). The user may select secure or clear mode by pressing a button on the user interface and may be notified by an indicator light, for example, while the secure connection is being established and a different indicator light when the secure connection is ready for use. These indicator lights may be oriented next to the button that corresponds to the mode to which they are referring.

BRIEF DESCRIPTION OF THE DRAWINGS

To illustrate the advantages and features of the invention, a detailed description of the invention will be depicted by reference to the appended drawings. The following drawings only provide selected embodiments of the invention and should not be considered to limit the scope of the invention.

DETAILED DESCRIPTION

Figure 1:
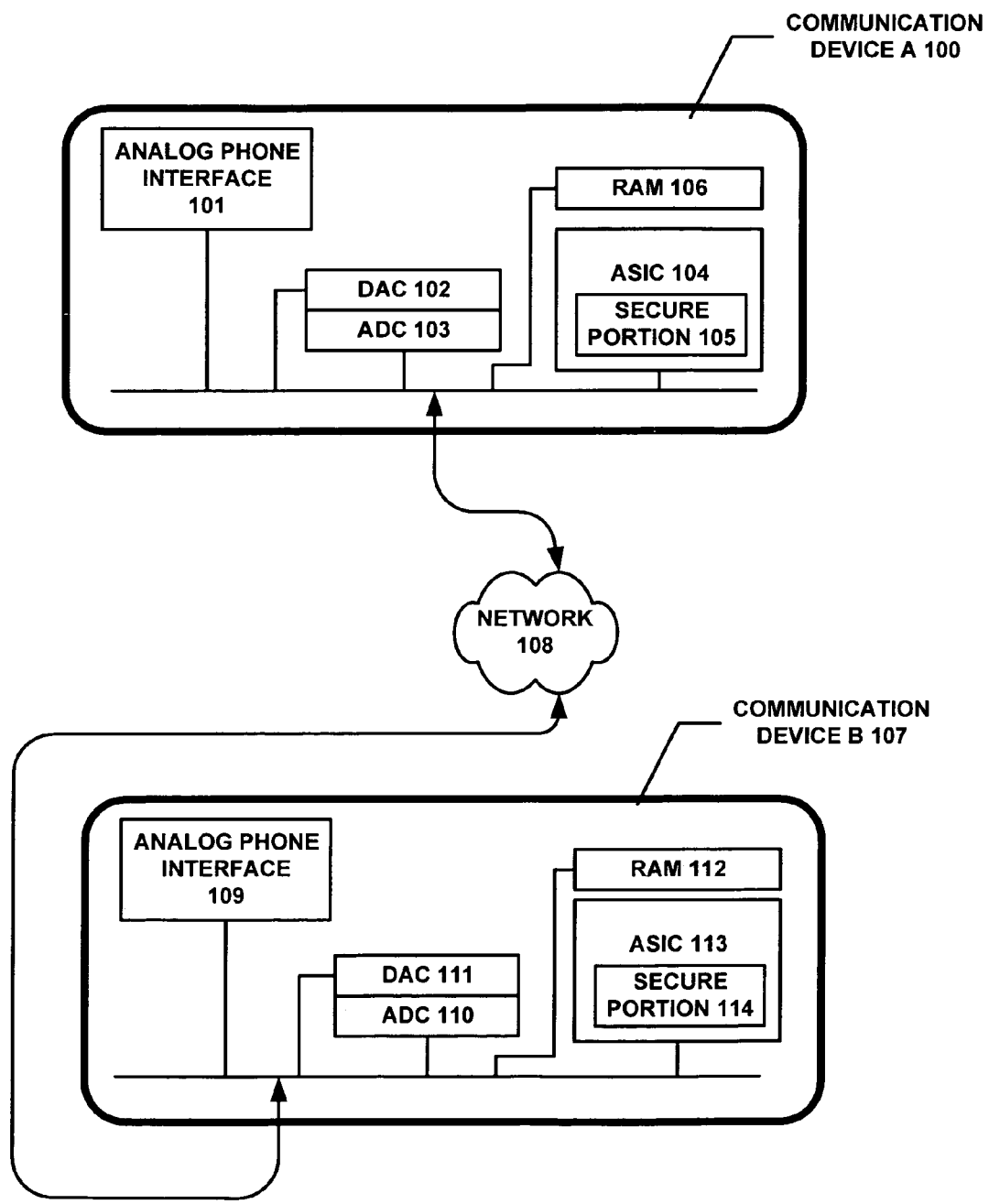
FIG. 1 is a diagram illustrating the secure device mechanism, in accordance with one embodiment of the invention.

An embodiment of the invention permits secure communication over a network. Thus, users of a device (e.g., a telephone) embodying the invention may speak to other users in a way that protects the conversation from unwanted third party listeners. The secure telephone communication system described is achieved by encrypting data derived from voice signals created by the telephone user. Encryption of data entails converting the communication into ciphertext, thus making it nearly impossible to understand the data without a key to the code. The encoded message (e.g. ciphertext) is then sent over the telephone network to an intended recipient. The intended recipient's secure telephone then decrypts the message. Decryption is the deciphering of the encrypted message by the intended recipient of the message using at least one of the keys of an asymmetric key pair (e.g., a public/private key). In accordance with one embodiment of the invention, at least one of the keys from an asymmetric key pair are stored in a secure portion of the device that is not accessible to users. A private key may, for example, be stored within a secure portion of an ASIC or some other component of the secure communication device. The various mechanisms for securing the ASIC in accordance with one or more embodiment are described in further detail below.

Embodiments of the invention utilize the public and private key data stored in the secure portion of the ASIC to permit secure communication over any device that may be utilized to transmit data to and receive data from another device. For example, embodiments of the invention may be incorporated into telephones, walkie-talkies, garage door openers, pagers, car alarms, video conferencing and other any other communication device used to send and/or receive data.

In the case of garage door openers the signal to open or close the door is encrypted with the user interface, and the device that performs the said function (i.e. the receiver of the signal) decrypts this signal. Similarly, in the case of car alarms, the signal transmitted from a hand-held device or other such device employed to activate the alarm, may be encrypted and thereby personalized for the user of the device. Other embodiments of the invention include secure Internet or network appliances. For example, one embodiment may incorporate the invention into a computer or network appliance so as to secure transmissions and communications on the internet or network. This includes encryption and decryption of messages and data transmissions over a network or the Internet via a secure network appliance.

Embodiments of the invention may comprise any communication device having hardware and/or software for performing and relating to the encryption and decryption of data, a user interface allowing the user to select between different communication types, and a network over which the communication data may be transmitted. Aspects of the methodology utilized to accomplish encryption and/or decryption may be embedded in a computer chip that sits inside a communication device having an interface for selecting between different communication modes. This communication device would then be connected via a network to other secure or insecure communication devices over a wired or wireless network, with or without the Internet. The invention contemplates the transmission of encrypted and clear text information across any network capable of transporting data between devices. The network may couple the communication devices together in a multitude of fashions not limited to physical wires, satellite communications, radio waves, fiber optics, etc.

The components of the hardware capable of achieving this encrypted communication, in one embodiment of the invention are illustrated in FIG. 1. The apparatus comprises communication device (e.g. telephone) A 100, which contains an analog communication interface 101 coupled to a digital to analog converter (DAC) 102/analog to digital converter (ADC) 103. These elements enable the communication device to convert the analog voice signal to a digital signal and vice versa. For example, analog data obtained from the network via an analog communication interface is provided to the ADC so that the analog data (e.g., voice data) can be converted into digital data. The encryption/decryption operations may then be performed on the digital data. The communication device also contains an ASIC processor 104 comprising a secure portion 105 having at least one key from an asymmetric key pair and RAM 106.

The invention contemplates the use of many different types of analog to digital converters (ADCs 103). For instance, various embodiments of the invention may utilize a parallel (flash) converter, a successive approximation ADC, a voltage-to-frequency ADC, and/or an integrating ADC. All ADCs convert an analog voltage to a digital number representative of the input voltage in discrete steps with finite resolution. When analog or continuously varying electrical waveforms are applied to an ADC, the electrical waveforms are sampled at a fixed rate. Sample values are then expressed as a digital number, using a binary numbering system of 0's and 1's. The digital number represents the input voltage in discrete steps with finite resolution.

Digital to analog converters (DACs) 102 do the reverse operation of ADCs. Most DACs use some form of resistor network. The digital data is applied to the resistors in groups of bits. The resistances vary in definite ratios, and the current flow in each resistor has a direct relationship to the binary value of the bit received. In this way a distinct analog signal emerges from the resistor network. Embodiments of the invention contemplate using DACs when digital data is to be transmitted across a medium that utilizes an analog signal.

Another component of secure communication device A 100 is ASIC processor 104. In one embodiment of the invention, ASIC processor 104 is specifically designed to encrypt and decrypt the data transported across the communication network. ASIC processor 104 is configured in one embodiment of the invention to utilize asymmetric encryption schemes. For instance, the ASIC may be configured to use a mathematical transformation, such as the RSA algorithm, to scramble information so that it is incomprehensible without the appropriate cryptographic key.

ASIC processor 104 scrambles the data by breaking down the data into single bits of information and then utilizing the software embedded into the chip to encrypt or decrypt the information. In one embodiment of the invention, ASIC processor 104 is designed to have at least one key embedded into the device in a secure portion. For instance, a private key that complements a public key is embedded into the secure portion of the ASIC. In some instances, the entire ASIC is considered a secure portion by definition. In other cases, the secure portion of the ASIC is tamper proofed so that users cannot obtain access to the private key held in the secure portion.

The invention contemplates various mechanisms for tamper proofing the ASIC and/or the communication device itself in order to prevent unauthorized users from obtaining access to the private key. For example, the communication device itself may be sealed so as to discourage users form attempting to obtain the private key. In the instances where such simplistic measures are not considered sufficient additional steps to secure the data held in the ASIC may be taken. For instance, a secured casing may surround the ASIC or secure communication device may have electrical contact points connected to the memory portion of ASIC 104 where the private key is stored. If the electrical connection between the contact points fails, then the memory portion where the private key is configured to lose the stored private key. Once the key is erased, the communication device cannot be utilized in secure mode. In this case, if the casing around ASIC 104 is broken, the private key will be lost and hence recovering the private key becomes virtually impossible. The invention also contemplates other methods of tamper proofing the ASIC so that it has a secure portion. For instance, the invention also contemplates the use of protective coatings, decoys, and additional layers of encryption. For additional security, multiple ASICs may be used, each storing only portions of the private key.

Secure communication device A 100 also comprises Random Access Memory (RAM) 106. RAM 106 is the memory into which programs may be loaded, such as the software described above, and it is also where most programs may perform their functions.

Figure 2:
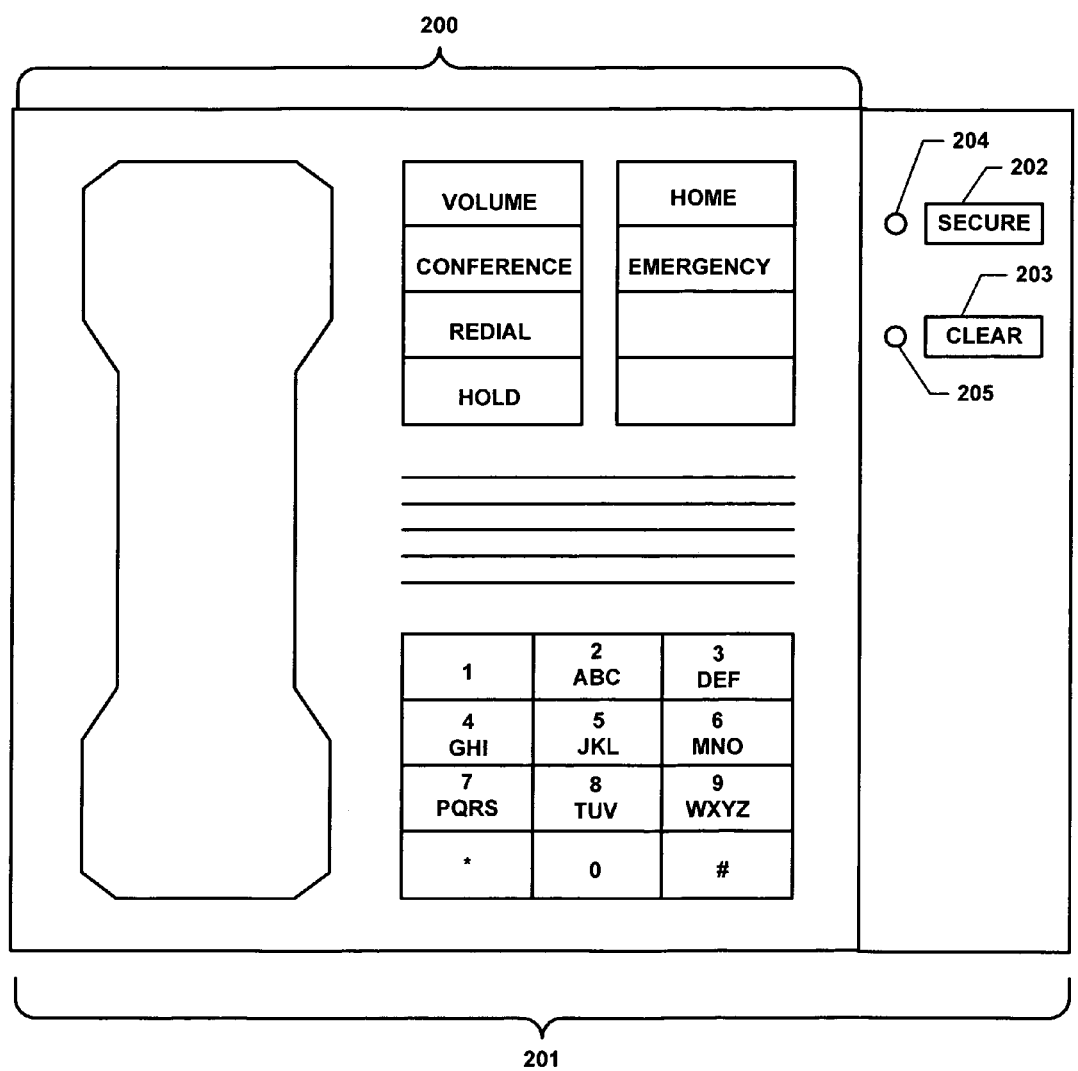
FIG. 2 is one embodiment of a secure telephone user interface, in accordance with one embodiment of the invention.

One embodiment of the secure communication device comprises a secure telephone terminal, which also includes a user interface illustrated in further detail in FIG. 2. In addition to conventional telephone interface 200, secure telephone terminal 201 includes a secure mode button 202 and a clear mode button 203. Each button may have a corresponding display element represented in FIG. 2 by lights 204 and 205 respectively. Upon selecting secure mode button 202, a user initiates the process for encrypting a telephone conversation. If clear mode button 203 is selected, then the telephone functions as a standard analog telephone and operates as if none of the described modifications have been made to the telephone. Each of the buttons' corresponding display elements 204 and 205 indicates which mode, clear or secure, has been chosen and the status of that mode (i.e. active, standby).

Other embodiments of the invention may include a secure walkie-talkie communication device. The secure walkie-talkie may also be equipped with a secure mode button and clear mode button, along with the corresponding display provisions that may indicate the status of the communication link. Likewise additional embodiments of the invention may include, a secure garage door opener, secure wireless telephone 1000, and secure car alarm terminal.

One embodiment of this invention would then have secure communication terminal A 100 connected to similar secure terminals (e.g., secure communication terminal 107) through a wired or wireless communication network 108 with or without using the Internet. If the data network is digital, ADCs and DACs are already intrinsically included into the system would not therefore need to be treated as an addition or modification. Thus, embodiments of the invention may be adapted to utilize any sort of communication network or interconnection fabric. Secure communication device B 107 contains a complementary set of components to secure communication device 100. In one embodiment of the invention both device can encrypt and decrypt message data by using the components therein. Secure communication device B 107 may, for example, also contain an analog communication interface 109, an ADC 110, a DAC 111, RAM 112 and an ASIC 113 having a secure portion 114 for storing a key, and the various interconnects required to move data from component to component.

Figure 3:
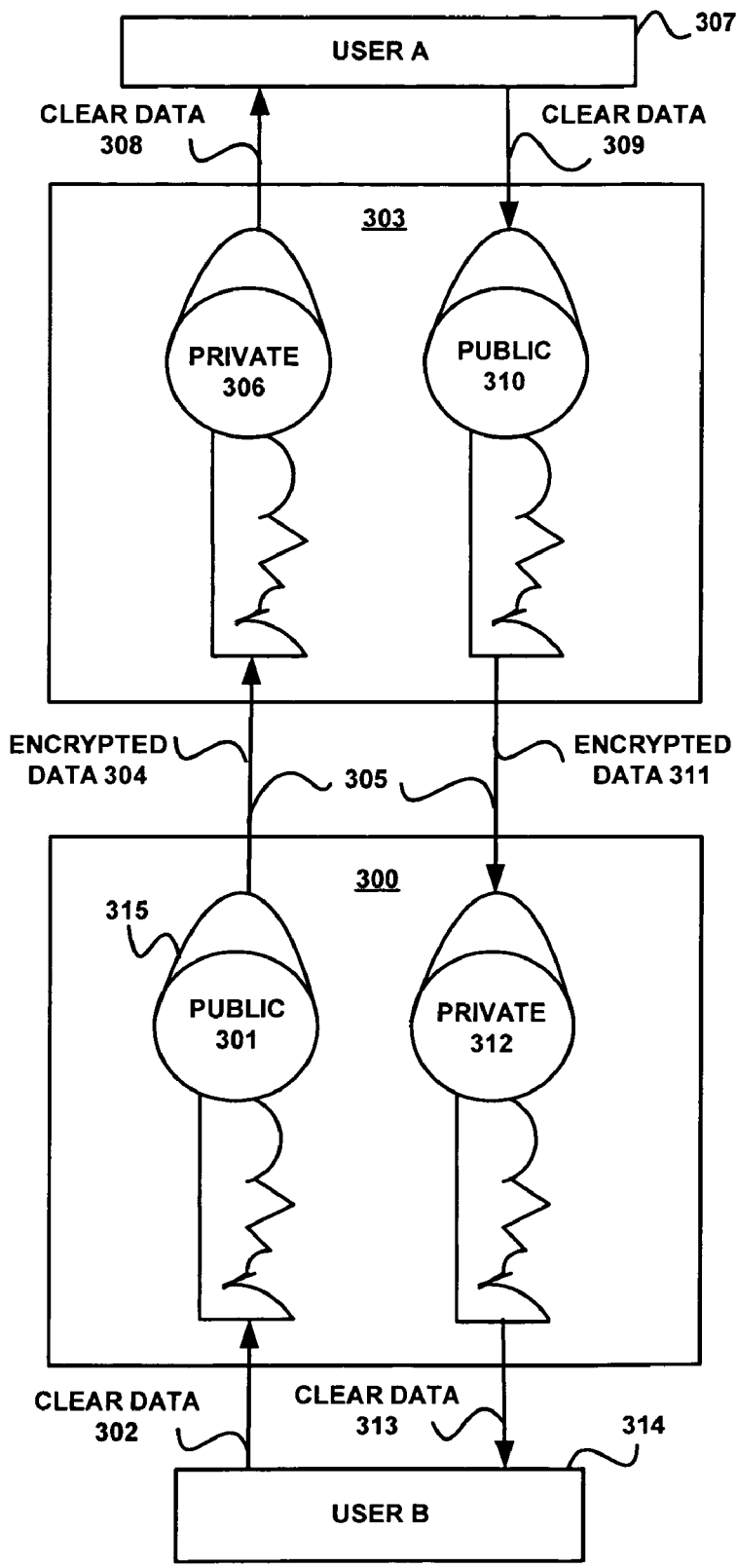
FIG. 3 is an illustrative depiction of the public/private key encryption/decryption method, in accordance with one embodiment of the invention.

The security in this invention is primarily achieved by employing an encryption/decryption scheme with the use of public/private key architecture as shown in FIG. 3. In one such setup, user B's secure communication device 300 will utilize user A's public key 301 to encrypt clear data message 302, which is then sent to user A's secure communication device 303 as encrypted data 304. User B's communication device 300 may previously obtain public key 301 from data transmissions received from user A's secure communication device 303. When user B's secure communication device 300 transmits data encrypted with user A's public key 301 across a network 305 to user A's secure communication device 303, user A's secure communication device 303 may then utilize user A's secure communication device's private key 306 to decrypt the data.

As discussed above, the private key is held in a secure area of the secure communication device 303 and utilized to decrypt data that was encrypted with the corresponding public key 301. User A 307 may then receive clear data 308 that has been decrypted by private key 306. Similarly, User A 307 may send clear data 309 to user A's secure communication device 303. User A's secure communication device 303 may then use User B's public key 310 to encrypt clear data 309. This encrypted data 311, is then transmitted to user B's secure communication device 300 over a network 305. User A's communication device 303 may previously obtain public key 310 from data transmissions received from user B's secure communication device 300. Upon receiving the data, user B's secure communication device 300 may then use user B's private key 312, which may be embedded into a secure portion of user B's secure communication device 300, to decrypt encrypted data 311, in order to produce clear data 313 to user B 314.

The encryption and decryption may be completed with various algorithms that may be programmed into ASIC processor 104 or ASIC processor 113. Embodiments of the invention may use one or more layers of encryption to protect the data. For example, an asymmetric cryptosystem may be used in combination with a symmetric cryptosystem or multiple layers of asymmetric encryption can be used (e.g., multiple keys are utilized to encrypt/decrypt the data). Thus, a first key can be utilized to determine whether access to the secure portion is authorized and a second key obtained from the secure portion could be utilized to provide the encryption and/or decryption functions.

There are currently two kinds of cryptosystems, symmetric and asymmetric, which can be used in a wireless or cellular network, landline network, or a combination of the two. Symmetric systems use the same key to encrypt and decrypt a message. Two popular symmetric encryption algorithms are DES and IDEA. Asymmetric cryptosystems tend to be more secure and use one key, a public key, to encrypt a message, and a separate key, the private key to decrypt that message. One current asymmetric cryptosystem is RSA, named for its inventors Rivest, Shamir and Adleman. The RSA algorithm is currently one of the more secure encryption methods, and may be used as the encryption method in the present invention. RSA is based on the concept that it is easy to multiply two large prime numbers together, but extremely time consuming to factor them back from the result. The algorithm is as follows:

Two very large prime numbers (A & B), normally of equal length, are randomly chosen then multiplied together.
Therefore, let N=A*B
and let T=(A−1)*(B−1)

A third number is then also chosen randomly as the public key (E) such that it has no common factors (i.e. is relatively prime) with T. Another number as the private key, D is then found such that ((E*D)−1) is divisible by T.

To encrypt a block of plaintext (M) into ciphertext (C):
C=$M^E$ mod N; mod is the modulus or signed remainder after division.

To decrypt:
M=$C^D$ mod N

As a simple example:
A=13; B=17
So, N=221; T=(13−1)(17−1)=192
E is arbitrarily chosen as 7, for the public key.
D=55 (so that (7*55−1)/T=2)

To encrypt a message, M of the character "H," H could be represented as "8," since it is the $8^{th}$ letter of the alphabet. To put that message into ciphertext, $C_{ciphertext}$=$8^7$ mod 221=83
83 is now the code. To decipher,
M=$83^{55}$ mod 221=8, or H In this case, at most an eavesdropper may have the ciphertext and the public key, and so by factoring N (the product of the two large prime numbers) the eavesdropper could determine the private key to the RSA encryption. However, this is incredibly difficult to accomplish, given that large numbers are very difficult to factor, even with the most highly equipped computers. Therefore for now, it is fair to say that the RSA encryption algorithm is secure by today's technical standards.

Figure 4:
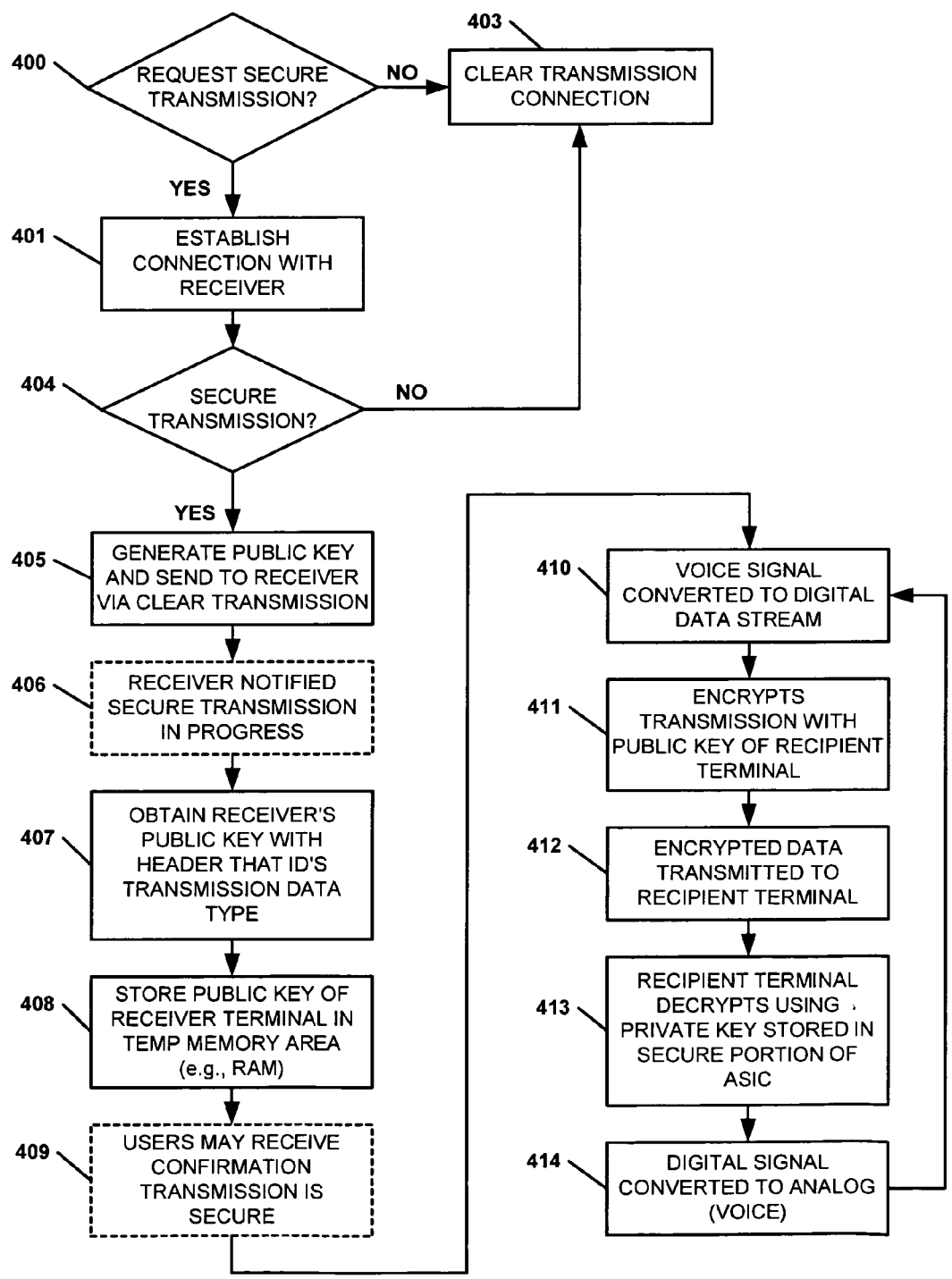
FIG. 4 is the portion of a flowchart illustrating logical steps of the present invention, in accordance with one embodiment of the invention.

One logical process utilized by an embodiment of the invention is illustrated in FIG. 4. The user first indicates whether a secure or clear mode transmission is desired at step 400. In one embodiment of the invention, this is accomplished by pressing the corresponding button 202 or 203 on user terminal 201. Next, the user initiates a call to another telephone terminal 401 by dialing its telephone number, as in the case of a conventional telephone call. If clear mode is chosen then a clear transmission connection commences at step 403. If the secure mode is chosen then display 204 next to the secure mode button 202 first indicates that the system is not ready for secure communication (i.e. with a red light). The system may then establish a connection to the desired communication device (e.g., at step 401) and determines whether the target terminal is a secure communication device or a conventional, unmodified communication device (e.g., at step 404). If the target terminal is not a secure communication device then light 204 on the user interface informs the user that this is the case, with colored illumination (i.e. a red light). The user then has the option to continue the communication in clear mode (e.g., step 403), or to terminate the connection.

If secure communication device A 100 recognizes terminal B 107 as also being a secure terminal, then light 204 indicates to the user (i.e. by colored illumination) that the secure transmission is pending. Secure communication device A 303 then generates public key 301, which can be used to encrypt data sent to secure communication device A 303, and sends it to secure communication device B 300 via clear transmission illustrated at step 405. Phone B 107 recognizes public key 301 due to a header 315 in the public key's data stream that identifies the transmission type. Header 315 may itself be encrypted with key cryptography such as SSL (Secure Sockets Layer), as one example. In such a case the secure phone system may be equipped with certificates for decoding the header encryption.

At step 406, the receiver is optionally notified that secure transmission is being attempted (i.e. with green illumination). Secure communication device A 100 then obtains public key 310 from secure communication device B 300 at step 407. In one embodiment of the invention, the receiver's public key is obtained from the header data that identifies the transmission data type. However, the public key may also be obtained using any mechanism capable of downloading the public key to the appropriate device. Secure communication device A 303 may then store public key 310 in a temporary memory area at step 408. The transmission is now secure and both users may receive confirmation as such by light 204 (i.e. green illumination) at step 409.

When user A speaks, an analog to digital converter may convert the voice data to a digital data stream at step 410. User B's public key can then be utilized to encrypt the transmission at step 411. The encrypted data then travels over network 108 and is transmitted to recipient secure communication terminal B 107 at step 412. Secure communication terminal B 107 then obtains private key 312 from the secure portion of the ASIC and utilizes it to decrypt the transmission at step 413. A DAC can then be used at step 414 to convert the decrypted digital signal to an analog voice signal. Once the signal is converted it can be presented to the recipient for hearing.

Figure 5:
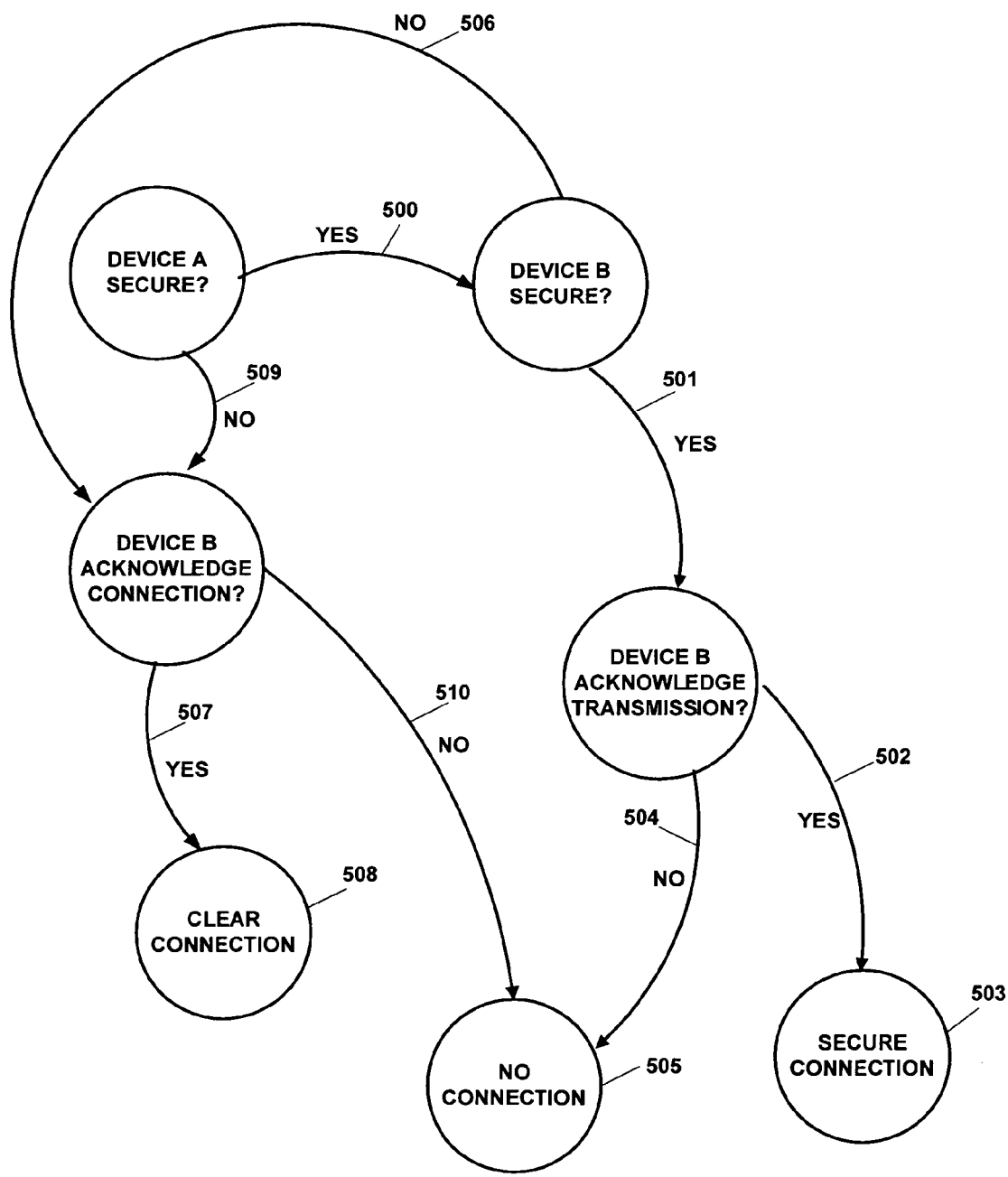
FIG. 5 is one demonstration of the communication between the transmitting device and the receiving device in order to determine the state of the connection (i.e. secure, clear, no connection), in accordance with one embodiment of the invention.

In one embodiment of the invention a connection of any type occurs after various logical processes. One embodiment of such a process, to determine the state of a connection may be according to the logical steps of FIG. 5. If communication device A is secure 500, then if device B is additionally secure 501 and device B also acknowledges the transmission 502, then there is a secure connection 503. If device B does not acknowledge the transmission 504 then there is no connection 505. If device A is secure 500 but device B is not secure 506, and device B does acknowledge the transmission 507, then there is a clear connection 508. Additionally if neither device A is secure 509 nor device B is secure 506, but device B acknowledges the transmission 507, then there is also a clear connection 508. Finally, if device A is not secure 509 and device B does not acknowledge the transmission 510, then there is no connection 505. Only in state 503 or 508 do the logical processes of FIG. 4 ensue.

Thus, a method and apparatus for performing secure communications is described. The invention, however, is defined by the claims and the full scope of their equivalents.

The invention claimed is:

1. A method for securely transmitting data from a sending communication device to a receiving communication device comprising:
 in response to a user input selecting a secure mode via a user interface on a sending communication device, asserting a first notification via said user interface indicating to a user that a secured connection is not ready, and initiating a connection with a receiving communication device;
 determining whether said receiving communication device is capable of secured communication, and based on said determination selectively asserting a second notification via said user interface indicating to said user that a channel status from the set comprising:
  unsecured channel available; and
  secured channel pending;
 receiving at said sending communication device at least one public key from said receiving communication device, said public key corresponding to at least one private key of said receiving communication device that is stored in a secure portion of said receiving communication device;
 in response to receipt of said at least one public key, said sending communication device redirecting user communications through an encryption circuit and asserting a third notification via said user interface indicating to said user that a secure channel is active;
 using at said sending communication device said at least one public key to transform clear digital data into encrypted digital data; said sending communication device forwarding said encrypted digital data to said receiving communication device; and
 using said at least one private key at said receiving communication device to decrypt said encrypted digital data.

2. The method of claim 1 wherein said secure portion comprises a processor.

3. The method of claim 2 wherein said processor comprises an Application Specific Integrated Circuit (ASIC) having said secure portion for holding said at least one private key.

4. The method of claim 1 wherein said secure manner comprises a means for tamper proofing.

5. The method of claim 4 wherein said means for tamper proofing erases said at least one private key upon an indication of tampering.

6. The method of claim 1 wherein said using said at least one private key at said receiving communication device to decrypt said encrypted digital data further comprises:
 obtaining said at least one private key from a processor.

7. The method of claim 1 wherein said receiving communication device determines the authenticity of said at least one public key.

8. The method of claim 1 wherein said secure portion comprises a tamper proof ASIC.

9. The method of claim 8 wherein authentication is required for access to said secure portion.

10. The method of claim 9 wherein said authentication utilizes encryption.

11. A system for securing data communications between a sending communication device and a receiving communication device comprising:
 a sending communication device comprising:
  a first processor comprising a sender's secure portion, said sender's secure portion having at least one sender's private key;
  a first Analog to Digital Converter (ADC) configured to obtain analog data from a user and convert said analog data to digital data;
  a first memory medium comprising a receiver's public key;
  a user interface configured to receive a user input to toggle between a clear channel and a secured channel, said user interface comprising a user notification element indicating a current mode from a clear mode and a secure mode and a current status from an active status and a pending status; and
  a first module configured to forward at least one sender's public key to a receiving communication device associated with said at least one sender's private key, wherein said first module is responsive to said user input;
 an interconnection fabric configured to couple said sending communication device with a receiving communication device;
 said receiving communication device comprising:
  a second memory medium comprising a second module configured to obtain said at least one sender's public key from said sending communication device;
  a second processor comprising a secure portion, said secure portion having at least one receiver's private key which complements said at least one receiver's public key;
  said first module configured to transform said digital data to encrypted data using said at least one receiver's public key and provide said encrypted data to said receiving communication device via said interconnection fabric;
  said receiving communication device configured to utilize said at least one receiver's private key from said receiver's secure portion to transform said encrypted data back to said digital data;
  said receiving communication device having a second Digital to Analog Converter (DAC) configured to transform said digital data to resulting analog data.

12. The system of claim 11 wherein said first processor and said second processor each comprise at least one Application Specific Integrated Circuit (ASIC).

13. The system of claim 11 wherein said first module configured to forward said at least one sender's public key to said receiving communication device encapsulates said sender's public key in a data header.

14. The system of claim 11 wherein said receiving communication device authenticates said sender's public key.

15. The system of claim 14 wherein said authentication depends upon verification of a sender's digital signature associated with said at least one sender's public key.

16. The system of claim 11 wherein said sending communication device authenticates said receiver's public key.

17. The system of claim 16 wherein said authentication depends upon verification of a receiver's digital signature associated with said at least one receiver's public key.

18. The system of claim 11 wherein said analog data comprises voice data provided by said user.

19. The system of claim 11 wherein said sending communication device and said receiving communication device are telephones.

20. The system of claim 11 wherein said receiving communication device further comprises:
   a second ADC configured to obtain an analog data reply from a receiving user at said receiving communication device and convert said analog data reply to a digital data reply;
   said second module configured to transform said digital data reply to an encrypted data reply using said at least one sender's public key and forward said encrypted data reply to said sending communication device;
   said sending communication device configured to obtain said at least one sender's private key from said secure portion and utilize said at least one sender' private key to transform said encrypted data reply to said digital data reply;
   said sending communication device having a first DAC configured to transform said digital data reply to an analog data reply.

21. An apparatus for sending secure data to a receiving apparatus comprising:
   a first Analog to Digital Converter (ADC) configured to obtain an analog data signal and convert said analog data signal to digital data;
   a first Application Specific Integrated Circuit (ASIC) comprising a secure portion, said secure portion having at least one sender's private key;
   a first memory medium comprising a means for obtaining a receiver's public key from a receiving apparatus and using said at least one receiver's public key to transform said digital data to encrypted data;
   a communication link for transmitting said encrypted data to said receiving apparatus; and
   a user interface enabling a user to selectively engage said first ADC and said means in a communication path to toggle between a secure mode and a clear mode, said user interface providing an indicator to said user of a current mode from said clear mode and said secure mode and a current status from an active status and a pending status.

22. The apparatus of claim 21 further comprising: said first memory medium comprising a means for transmitting at least one sender's public key which complements said at least one sender's private key to said receiving apparatus.

23. The apparatus of claim 21 wherein said sending apparatus comprises a telephone.

24. The apparatus of claim 23 wherein said telephone further comprises a means for determining if said receiving apparatus is secure.

25. The apparatus of claim 21 further comprising:
   an interface configured to convey to a user when said communication link is secure.

26. The apparatus of claim 25 wherein said interface comprises an indicator light for conveying whether said communication link is secure.

27. The apparatus of claim 21 wherein said first ASIC comprises a means for tamper proofing.

28. The apparatus of claim 27 wherein said means for tamper proofing erases said at least one sender's private key upon an indication of tampering.

29. The apparatus of claim 21 wherein access to said secure portion of said ASIC requires authentication.

30. A communication device comprising:
   a first public key of a first public key/private key pair;
   a memory;
   an integrated circuit having in a secured portion an embedded private key of said first public key/private key pair, said integrated circuit comprising a processor configured to provide asymmetric decryption using said embedded private key and asymmetric encryption using a second public key accessed from said memory;
   a user interface comprising at least one user input element and at least one user notification element, wherein said at least one user input element is responsive to user input to select from a clear communication mode and a secure communication mode, and wherein said at least one user notification element is configured to indicate a selected mode from said clear communication mode and said secure communication mode, and to indicate a current status of said selected mode from a pending status and an active status;
   a channel securing function responsive to said at least one user input element, wherein said channel securing function is configured to determine whether a target communication device is enabled for said asymmetric encryption and asymmetric decryption, to forward said first public key to said target communication device and obtain said second public key associated with a second public key/private key pair of said target communication device, and to engage said asymmetric encryption and asymmetric decryption of communications once a connection with said target communication device is established and said second public key is obtained.

* * * * *